(12) United States Patent
Sella

(10) Patent No.: US 8,865,047 B2
(45) Date of Patent: Oct. 21, 2014

(54) SOLID FREEFORM FABRICATION OF EASILY REMOVEABLE SUPPORT CONSTRUCTIONS

(75) Inventor: Nadav Sella, Tel-Aviv (IL)

(73) Assignee: Stratasys Ltd., Rehovot (IL)

( * ) Notice: Subject to any disclaimer, the term of this patent is extended or adjusted under 35 U.S.C. 154(b) by 777 days.

(21) Appl. No.: 13/149,271

(22) Filed: May 31, 2011

(65) Prior Publication Data

US 2012/0308805 A1    Dec. 6, 2012

(51) Int. Cl.
*B29C 41/02* (2006.01)
*B29C 31/10* (2006.01)
*B29C 67/00* (2006.01)

(52) U.S. Cl.
CPC ............. *B29C 31/10* (2013.01); *B29C 67/0062* (2013.01); *B29C 67/0059* (2013.01); *B29C 67/0092* (2013.01)
USPC .......................................... 264/308; 264/334

(58) Field of Classification Search
CPC .................... B29C 67/0062; B29C 67/0092
USPC .................................................. 264/308, 334
See application file for complete search history.

(56) References Cited

U.S. PATENT DOCUMENTS

| | | | |
|---|---|---|---|
| 5,286,573 A * | 2/1994 | Prinz et al. ................... | 264/308 |
| 2004/0239009 A1* | 12/2004 | Collins et al. ................ | 264/497 |
| 2005/0053798 A1* | 3/2005 | Maekawa et al. ......... | 264/497 X |
| 2005/0131570 A1* | 6/2005 | Jamalabad et al. ....... | 264/401 X |

* cited by examiner

*Primary Examiner* — Leo B Tentoni
(74) *Attorney, Agent, or Firm* — Pearl Cohen Zedek Latzer Baratz LLP

(57) ABSTRACT

A support construction and a method of creating a support construction in a volume generated by solid freeform fabrication, where the support construction includes layers of supporting materials, such layers comprising a continuous strip of material within such volume such that when the strip is lifted or pulled, the layers of supporting materials including the strip are removed together from the volume.

14 Claims, 4 Drawing Sheets

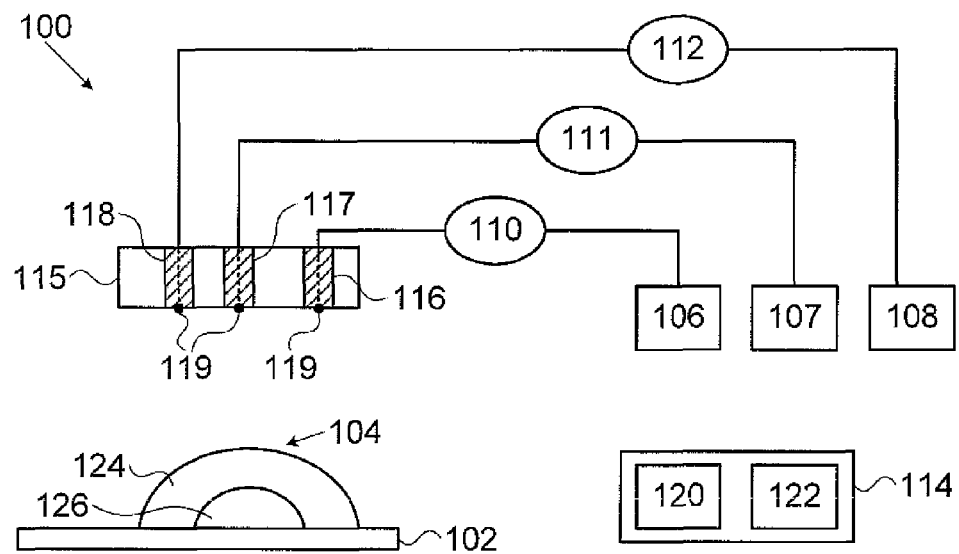
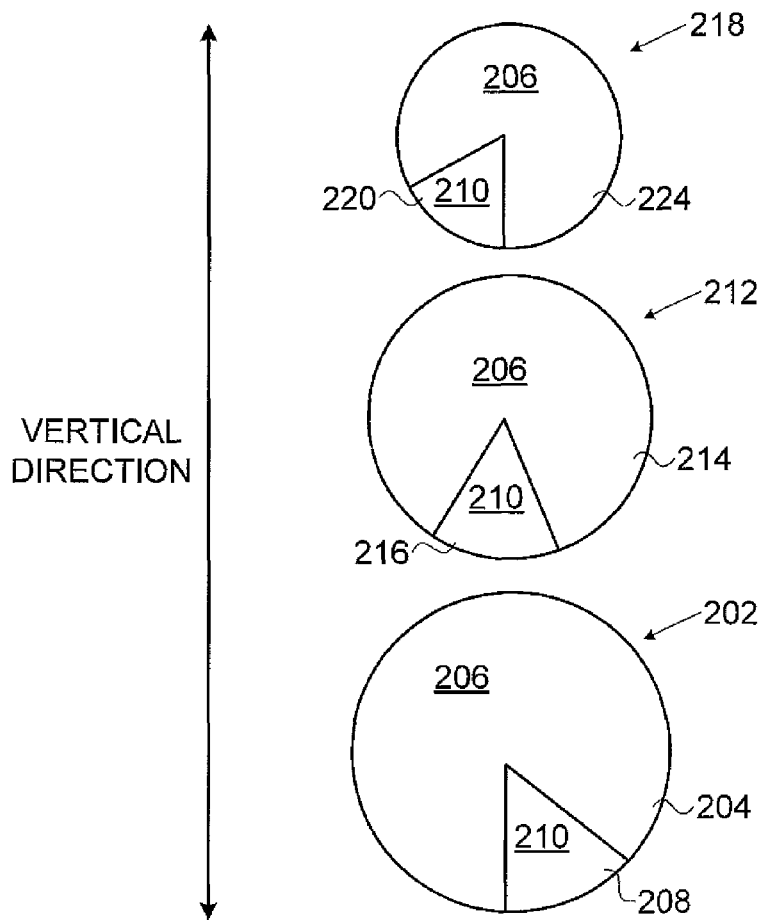
FIG. 1
FIG. 2A

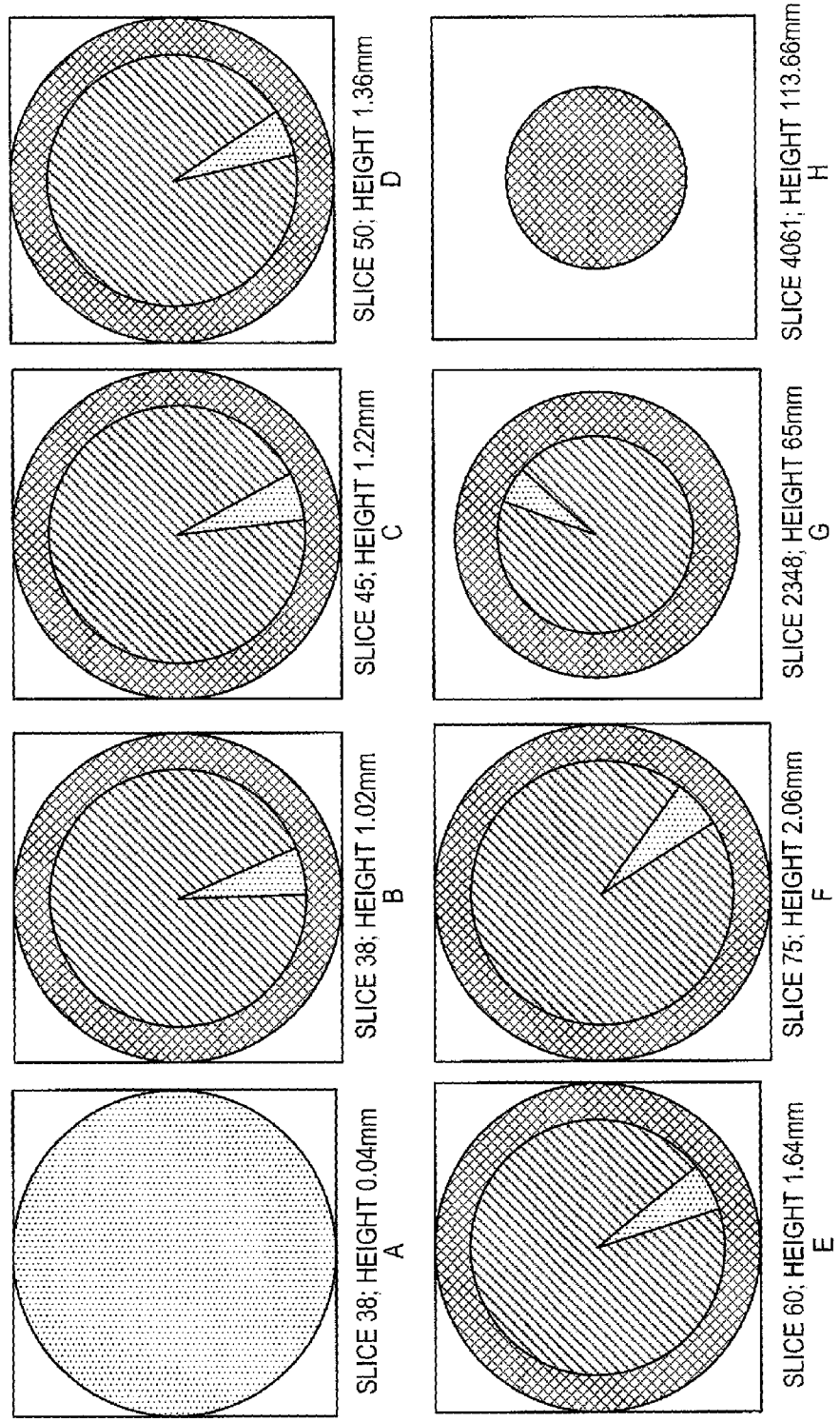

SOLID FREEFORM FABRICATION OF EASILY REMOVEABLE SUPPORT CONSTRUCTIONS

FIELD OF THE INVENTION

The invention relates to Solid Freeform Fabrication (SFF) or layer by layer three-dimensional printing, and in particular to support constructions that may be easily removed from a printed three-dimensional object.

BACKGROUND OF THE INVENTION

SFF is a process in which three-dimensional (3D) objects are constructed utilizing a computer model of the objects. These processes are used for example for visualization, demonstration and mechanical prototyping of objects.

One SFF technique, known as 3D printing, is performed by layer-by-layer inkjet deposition of building materials. Depending on the materials, the layers are then cured or solidified. The process of layer by layer deposition and solidification is repeated until a 3D object is formed. The building materials may include modeling materials and supporting materials, which form the object and the temporary support constructions supporting the object as it is being built, e.g. where objects include overhanging features or shapes, e.g. curved geometries, negative angles, voids, and so on. After completion of printing, support constructions are generally removed to reveal the final shape of the fabricated object.

Generally speaking, during SFF a material is deposited to produce the desired object and another material is deposited to provide support for specific areas of the object during building, and to assure adequate vertical placement of subsequent object layers. In some cases, the same material is used for forming both the object and the support structures supporting it. The materials may be initially liquid or viscous and are subsequently hardened to form the required layer shape. The hardening process may be performed by a variety of methods, e.g. cooling or UV curing.

Removal of a support structure from an object may be difficult and time consuming, and may also damage the final formed object. It would therefore be advantageous to have a method of SFF enabling easy, inexpensive, fast and convenient removal of support constructions from a fabricated object.

SUMMARY OF THE INVENTION

Some embodiments of the invention may include a method of constructing a support construction through a process of fabricating a three dimensional (3D) object, where the method includes selectively depositing in layers, layer by layer, a modeling material according to cross-sectional layers of the 3D object, selectively depositing in the layers to form a support construction, a first and second supporting materials, where the first and second supporting materials are deposited in a volume designed to be an empty space in the 3D object, and where the support construction includes a strip of the first supporting material where such strip intersects the layers in the volume; and removing the support construction from the volume upon application of a lifting force on the strip.

In some embodiments, the strip may be configured as a coil within the volume.

Some embodiments may further include depositing the second supporting material between an edge of the modeling material in the layer and an edge of the support construction comprising the first and second supporting materials in the layer, to form a release layer surrounding the support construction.

Some embodiments may include depositing a plurality of layers comprising the second supporting material before depositing layers comprising the modeling material and the first and second supporting materials, where said layers comprising modeling material and first and second supporting materials are deposited on top of said layers comprising second supporting material.

Some embodiments may include a method of constructing a support construction in a process of fabricating a three dimensional (3D) object, where the method includes selectively depositing, layer by layer, a modeling material according to cross-sectional layers of the 3D object being constructed and a first and a second supporting materials that are configured as a support construction in a volume that is designed as an empty space in the 3D object. In some embodiments, the support construction includes a strip of the first supporting material that intersects horizontal layers in the volume, and the support construction includes a second supporting material that fills in at least a portion of the volume not filled by the first supporting material. In some embodiments, upon application of a lifting force on the strip of first material, the strip and the second supporting material are removed from the volume.

Some embodiments may include selectively depositing a second supporting material on at least a point between the modeling material and the first and second support materials forming the support construction in a layer.

In some embodiments, selectively depositing the first supporting material includes selectively depositing the first supporting material as a continuous strip intersecting support construction layers.

Some embodiments may include a method of producing a support construction by solid freeform fabrication, where such method may include depositing a first layer of the support construction, a first area of the first layer including a first material, and a second area of the first layer including a second material; and depositing, over the first layer, a second layer of the support construction, where a first area of the second layer includes the first material and a second area of the second layer includes the second material, where the first area of the first layer adheres to a portion but not all of the first area of the second layer. In some embodiments, upon application of a pulling force to the first area of the first layer, at least a portion of the first layer is removed from the support construction, and the first area of the first layer conveys the pulling force to the first area of the second layer, and a portion of the first layer and a portion of the second layer are removed from the support construction.

In some embodiments, the first material may be deposited on an area of the first layer that is more than half of the first layer, and the first material may be deposited on an area of the second layer that includes more than half of the second layer.

In some embodiments, the first material in the first layer and the second layer forms a continuous strip of first material through the first layer and the second layer.

In some embodiments, an area of first material in the first layer and an area of first material in the second layer include an area that has a vertical axis at a center of the area of first material in the first and the second layers, where a vertical axis in the first layer intersects with a vertical axis in the second layer.

In some embodiments, the first area in the second layer intersects with a bottom of the second layer and a top of the second layer at congruent angles, and the first area in the first layer intersects with a bottom of the first layer and with a top of the first layer at substantially congruent angles, all of such angles being non-right angles.

In some embodiments, a set of layers of supporting materials fills a volume of the support construction.

Some embodiments of the invention may include a support construction for a volume constructed by solid freeform fabrication, where such volume includes a first material deposited in an area of several layers of the volume and an area of a second material among such layers, where the first material has a tensile strength sufficient to lift the several layers of the first material when a first portion of the area comprising the first material is lifted above the support construction.

In some embodiments, the area of the first material is configured as a strip among the layers of the second material, and a layer of the second material is a layer situated above the strip relative to a direction of the lift.

In some embodiments, the strip is configured as a helix among the layers of the second material.

In some embodiments, the support construction includes an area of second supporting material surrounding the support construction layers.

In some embodiments, the support construction includes an area comprising layers of second supporting material beneath the layers comprising both model construction and support construction portions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanying drawings in which:

FIG. 1 is a schematic representation of a 3D printing system using solid freeform fabrication according to embodiments of the invention;

FIG. 2A is a schematic representation of layers of supporting materials that include an area of first material and an area of second material according to embodiments of the invention;

FIG. 2B is a schematic representation of layers of the object and its support construction;

DESCRIPTION OF THE INVENTION

Figure 3A:
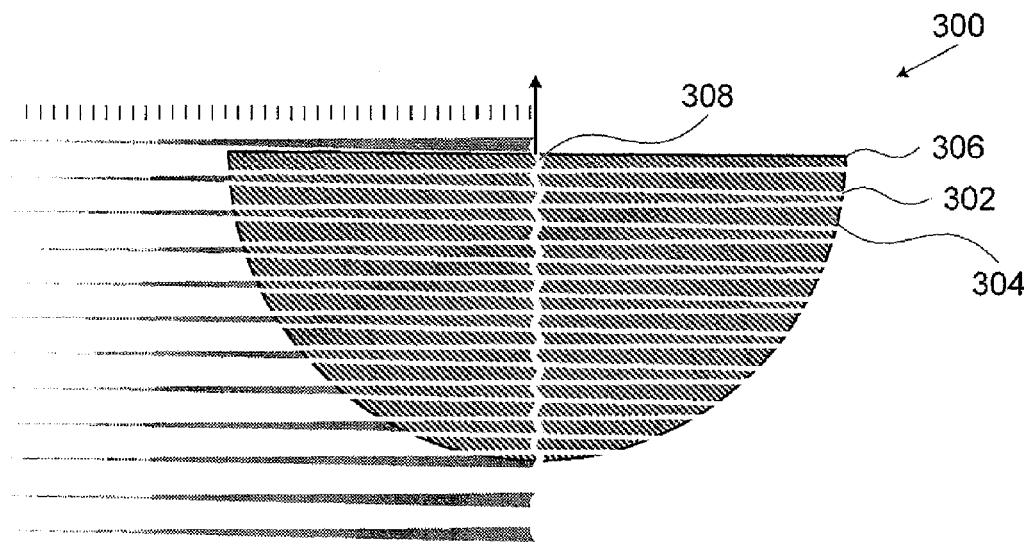
FIG. 3A is a cut-away view of a support construction comprising layers that include an area of a first material and an area of a second material according to embodiments of the invention.

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention. It is to be understood that the phraseology and terminology employed herein is for the purpose of description and should not be regarded as limiting.

In addition to its regular meaning, the terms "strong" and "strength" in this specification and claims may refer to the relative difference in modulus of elasticity among materials such as modeling materials and support materials or combinations of such materials. The strength of a material may be described, for example, by reference to its modulus of elasticity, which may be defined as the ratio of stress to its corresponding strain under given conditions of load, for materials that deform elastically, according to Hooke's law. In some embodiments, the term 'strength' may include a propensity of a material to adhere to another material and particularly to adhere to a similar material with which it is brought into contact. Strength may also include a relative tensile strength of the material.

The term "supporting material" as used throughout the specification and claims may comprise a material or materials that are not part of the final 3D object, and which are used to provide provisional support during solid freeform fabrication of a three-dimensional object. A support construction formed using such supporting materials may include materials that are different to the modeling materials used to fabricate the three-dimensional object, or modeling materials and support materials that are different to the modeling materials used to fabricate the three-dimensional object. Alternatively, one of the supporting materials may be a modeling material which is the same as a modeling material used in fabricating the three dimensional object.

The term 'coil' as used in this application and in addition to its regular meaning may include a film, wire, or sheet that follows a curved, circular or partially circular path within a plain. The term 'helix' as used in this application and in addition to its regular meaning may include a smooth curve of a film, wire, or sheet in three-dimensional space that may be characterized by the fact that a tangent at any point makes a constant with a fixed axis.

While the SFF system described herein for carrying out the methods of the invention is a 3D inkjet printing system, the methods of the invention are not limited to 3D inkjet printing and may be carried out by other SFF systems and methods.

Building materials in SFF may be categorized into two major categories: modeling material and support material. The modeling material is generally a composition which is formulated for use in SFF to form a 3D object. The support material generally serves to provide a support structure for supporting the object, e.g. overhanging object parts during the fabricating process and/or other purposes, e.g., filling voids, to provide hollow or porous objects.

In an embodiment of the invention, more than one modeling material and more than one supporting material may be used for forming each of the object and the support construction, each material being deposited by a different printing head in the SFF system, whereby two or more materials may be deposited simultaneously within a layer to form different parts of the same layer.

By simultaneously depositing the different materials from different print heads to form a layer, different layers of the three-dimensional object having different moduli of elasticity and different strengths may be produced. For example, a given layer may comprise, in parts: a model layer (otherwise known as an object construction), a support layer (otherwise known as a support construction) and a release layer (otherwise known as a release construction). In accordance with embodiments of the present invention, layers of materials deposited by the apparatus during the printing process may include a combination of one or more model constructions, support constructions and/or release constructions, i.e. each forming a different part or area of the layer, according to the requirements of the three-dimensional object being printed. Thus, when referring to object layers, support layers and/or release layers, any or all of these may be part or parts comprising a single whole 'layer' printed by the printing apparatus during the SFF process.

Generation of the 3D support construction is performed according to the geometry of the object in question, using designated software algorithms well known in the art.

The invention provides a method of constructing a support construction within a volume using SFF. Such construction may include depositing materials in horizontal layers to form said support construction, where the support construction comprises a strip of a first material intersecting at least two horizontal layers in the volume, and depositing in the volume a second material in the horizontal layers in areas not filled by the first material, so that upon an application of a lifting or pulling force on the strip, the strip of first material as well as all or part of the second material are removed together from the volume. In some embodiments, the strip may be configured as a coil or helix within the support construction volume and extend from a bottom layer of the volume to a top layer of the volume. The second material in each layer interfaces with the first material in the layer, and may or may not weakly adhere or connect to the strip of first material in the layer. The first material and the second material are deposited simultaneously, layer upon layer within the volume, each forming a part of each consecutive support construction layer.

In some embodiments, a method for creating a support construction by SFF may include depositing a first layer of the support construction, where the first layer includes at least two interfacing areas, a first of such areas comprising a first material, and a second area comprising a second material. In some embodiments, the first material may have a relatively high tensile strength and be deposited such that it forms part of a coil, strip or sheet passing through the layer. Over the first layer, there may be deposited a second layer of the support construction that also includes a first area made of a first material and a second area made of a second material, where such first and second areas interface with and/or are connected to each other in each respective layer, and where the first area of the first layer is adhered to at least a portion but preferably not all of the first area of said second layer. The adhered first areas of the two layers may, upon application of a pulling force to the first or outer layer, result in at least a portion of the first layer being removed from the support construction volume, and in a conveying of the pulling force from the first area of the first layer to the first area of the second layer, result in a remainder of the first layer and at least a portion of the second layer being pulled and removed from the support volume at the same time.

Some embodiments may include a method of constructing a support construction in a process of printing a three dimensional (3D) object, where the method includes selectively depositing, layer by layer, a modeling material according to cross-sectional layers of the 3D object being constructed and a first and a second supporting materials that are configured as a support construction in a volume that is designed as an empty space in the 3D object. In some embodiments, the support construction includes a strip of the first supporting material that intersects horizontal layers in the volume, and the support construction includes a second supporting material that fills in at least a portion of the volume not filled by the first supporting material.

According to the present invention, the first material in the first and second layers may form a continuous strip through the layers. In some embodiments, such strip of first material may have a tensile strength sufficient to lift two or more layers when a portion of an area of first material is pulled or lifted away from the level of the outer surface of the support construction. In some embodiments, the first material may be configured as a strip of first material within the layers of the support construction, and the second material in the first and subsequent layers may be configured to be situated adjacent to, below and/or above the strip, relative to a direction of a pulling or lifting force. In some embodiments, the strip may be configured as a helix of first material among and within, e.g. interspersed with the second material in the accumulated layers forming the support construction.

In some embodiments, the first layer comprising at least a portion of the first material and a portion of the second material may be preceded by one or more layers comprising only the second material. The preceding one or more layers form a 'pedestal' of supporting material, prior to formation of the 3D object and its support constructions on top of the pedestal, e.g. for easy lifting of the entire fabrication (object and support construction's) off the printing tray after completion of the printing process.

In some embodiments, an area of first material in each layer may share a vertical axis located at or near a center of the areas of first material in the layers, such that such areas are at least partially connected on such vertical axis throughout at least part of the support construction layers, and where such connected area may form a screw or spiral shape on a vertical axis of the several layers.

In some embodiments, layers comprising the support construction may substantially fill a support construction volume within at least part of the object construction. In some embodiments, a release layer comprising a seam of second material may be deposited on a boundary or circumference of the part of a layer comprising the support construction, i.e. between the support construction and the volume of modeling material forming the object. The release layer further enables easy removal of the support construction from the volume on completion of the printing process.

Reference is made to FIG. 1, a schematic depiction of an SFF system in accordance with an embodiment of the invention. System 100 may include a printing tray 102 upon which may be constructed an object being printed 104. System 100 may include a series of cartridges 106, 107 and 108 that may include one or more materials that may be used in the 3D printing process to fabricate object 104. Cartridges 106, 107 and 108 may be connected to pumps or valves 110, 111 and 112 that may feed materials from cartridges 106, 107 and 108 to a series of printing heads 116, 117 and 118, respectively. Each printing head comprises a separate number of nozzles or an array of nozzles (119) via which materials are deposited. Printing heads 116, 117 and 118 may be mounted in a printing block 115 which may move over the printing tray 102 in X and/or Y directions depositing materials in its path via nozzles 119 associated with each individual printing head in order to form each layer. Computer 114 which may include or be associated with a processor 120 and a memory 122, may regulate functions of one or more or cartridges 106, 107 and 108, pumps/valves 110, 111 and 112 and printing heads 116, 117 and 118, to control layer by layer deposition of the one or more materials to be used in the printing process to fabricate object 104. Cartridge 106 may store and feed via valve 110 to printing head 116 a solidifiable modeling material to form the layers of and thus the final 3D object. Cartridge 107 may store and feed via valve 111 to printing head 117 a different solidifiable material, e.g. a strong, high tensile strength modeling material to form layers of the object or, as in the present embodiment, layers of a high-tensile strength support construction, hereinafter the "first supporting material" or "first material". Cartridge 108 may store and feed via valve 112 to printing head 118 a weak, e.g. semi-solid or gel-like support material, hereinafter the "second supporting material" or "second material", to form parts of the layers of the support construction of the invention, and optionally other constructions as referred to hereinafter, e.g. a release layer.

In some embodiments, 3D object 104 being printed may include a volume 124 of modeling material which will form the final object, and a volume 126 that is to be printed primarily of supporting materials to provide a support construction for the object being printed, where volume 124 of modeling material surrounds and/or is supported by volume 126. For example, volume 126 may form the base or inside of a concave or a semispheric object design, the outside of which is printed with one or more modeling materials to form the final object. Other object designs and other shapes of volume 126 are possible. After the SFF process is complete, the support construction filling volume 126 is removed from the object.

In some embodiments, a release layer e.g. a seam of second material (not shown) may be printed or deposited onto a boundary or circumference of a support construction layer, i.e. between the support construction and the volume of modeling material forming the object. For example, in FIG. 1, such release layer may be deposited such that it is situated between layer parts of volume 124 and layer parts of volume 126, i.e. at the interface between them in the layer, to allow for ease of separation of a part comprising the support construction from a part comprising the object being fabricated.

Reference is made to FIG. 2A, a schematic representation of layers of supporting material including an area of another supporting material, according to embodiments of the invention. Volume 126 is printed layer-by-layer, such layers being in a substantially parallel horizontal plane relative to each other. FIG. 2A represents three layers comprising parts of volume 126: layers 202, 212 and 218 respectively, where layer 202 represents a first and outer layer of the support construction volume 126 as depicted in FIG. 1. When the SFF process is complete and the object and its support construction are removed from the printing tray 102, layer 202 will be an outer, i.e. exposed layer of support construction and thus easily accessible to a user or operator. Area 204 of layer 202, may cover for example two thirds, three quarters or another portion of layer 202, and may include a first supporting material 206, while area 208 of layer 202 may include a second, different supporting material 210.

In a preferred embodiment, the first material used in the supporting construction of the invention is a harder, sturdier, more adhesive or stronger material, e.g. a high tensile strength modeling material 206, than the second material used in said supporting construction, which is a weaker, gel-like material 210.

Material 206 may be a different modeling material to the modeling material or materials used to form object volume 124. As indicated in FIG. 2A, area 204 of high-tensile material 206 interfaces with one or more points of area 208 within the layer, such that area 204 and area 208 together form a single layer 202.

A second layer 212 may likewise be printed to include an area 214 of hi-tensile strength first material 206 and area 216 of weaker, second supporting material 210, such that areas 214 and 216 likewise interface with each other within the layer to form a single layer 212 that is printed over or above layer 202. Area 214 may be connected with area 204 over some, though preferably not all of the surface area of such areas 214 and 204, such that areas 214 and 204 may share some though preferably not all of their vertical axis. The portions of stronger material 206 in such two areas 214 and 204 that are connected, are adhered to each other at the time of or following the printing of layer 212. Since FIG. 2A is a schematic representation of construction layers, it may be understood for example that areas 214 and 204 may be adhered to each other directly or via adherence between similarly portioned, stronger, hi-tensile strength first material portions in one or more intervening layers.

At the same time, only a portion of area 208 at the top of layer 202 is in contact with and weakly adhered to a portion of area 216 that intersects with a bottom of layer 212.

Likewise, layer 218 comprises an area of hi-tensile strength first material 206 and an area of weaker support material 210, where the portion of material 206 in layer 218 which is substantially above the portion of material 206 in layer 212 in the vertical direction, is adhered to the portion of material 206 in layer 212 with which it comes into contact. Portions of areas comprising weaker second support material 210 (areas 220 and 216) are similarly in contact between the two layers 218 and 212. Repeatedly connected, adhered portions of the layers 202, 212 and 218, may share a vertical axis.

In some embodiments, the stronger first high tensile strength material is deposited in layers, and its areas of deposition in each layer runs at a slope or incline of for example 30-60° from a bottom of a layer to a top of the layer. The bottom edge of the strong material at the bottom surface of the layer may be connected or adhered to the top edge of the strong material of a layer below it, so that the high tensile strength first material forms a continuous strip, such as a ribbon or coil through the accumulating layers of the support construction. In some embodiments, the strip of strong material in the various layers may run parallel to each other such that the angles of intersection of the strip of strong material in a top and bottom of a first layer may be congruent to the angles of intersection of the strip at the top and bottom of other layers, and such angles may be other than right angles.

In some embodiments, the tensile strength of material 206 is sufficient to withstand a pulling force such that a pulling force applied to region 204 of layer 202 will also lift 206 material containing regions adhered to it in layers 212 and 218. In a preferred embodiment, when a pulling or lifting force is applied to a part of outer layer 202, such as to area 204, such pulling or lifting force drags along with it part or all of area 208 interfacing with it in layer 202. Area 204 conveys the pulling or lifting force to area 214 of layer 212 and in turn to area 224 of layer 218, since the 206 material-containing areas of the three layers are adhered together, (directly or via one or more intervening layers, as aforesaid). Thus by exerting a pulling force for example on an area of stronger material 206 of an outer or exposed layer 202 of a support construction, one or more adhered layers, e.g., layers 212 and 218 of such support construction are also lifted or pulled out of volume 200 in the same pulling or lifting motion. Some or all of the layers in volume 126, as represented in FIG. 2A by layers 202, 212 and 218, are lifted from volume 126 by a pulling force exerted on a single region 204 of an exposed or outer layer of the support construction in volume 126.

In some embodiments, planar orientation of area 216 of weaker material 210 in layer 212 may be rotated relative to the orientation and location of region 208 in layer 202 and relative to the orientation and location of region 220 of layer 218 below and above such layer 212, such that the regions of stronger material 206 in the accumulated layers form a helical or spiral shape through the various layers making up volume 126, partially separated by weaker material 210. While the layers depicted in FIG. 2A indicate a significant rotation of the 210 material area from one layer to another, the depicted layers are to be understood as being solely a graphic representation of different layers. In 3D printing, the layers making up 3D constructions are very thin, for example a layer may have a thickness in the region of 20 microns, and therefore between each layer as depicted in FIG. 2A there may be several intervening layers.

At least a portion of an area of high tensile strength material 206 in a layer may be in contact with and adhered to at least some portion of high tensile strength material 206 in both the layer above and the layer below. In some embodiments, a pulling or lifting force applied to the outer or exposed layer 202 of the support construction, may smoothly lift and remove some or all of the subsequent layers 212 and 218 of the support construction.

In some embodiments of the invention, the hard, solidifiable modeling material forming the 3D object may be for example FullCure® 830 VeroWhite (available from Objet Geometries Ltd., Israel), the stronger, high tensile strength first material 206 may be include for example TangoPlus™ (available from Objet Geometries Ltd., Israel), and the weaker, gel-like second support material 210 may be or include for example FullCure® 705 (available from Objet Geometries Ltd., Israel). Other materials having relatively similar properties may also be used. Using 3D inkjet printing heads, all of the materials are in liquid form when deposited. Any or all of the materials may also be in liquid form at ambient temperature prior to deposition. After being deposited in a layer, the materials are generally exposed to a source of curing, e.g. UV radiation; however other processes for solidification of any or all of the materials may be used. The properties of the materials described, e.g. hard solidifiable material, high-tensile strength material and weak, gel-like material, respectively, are the properties exhibited by each respective material after deposition and exposure to curing radiation or other solidification process.

FIG. 2B is a schematic representation of layers or 'slices' A-H of an object with a supporting structure being fabricated by SFF according to embodiments of the invention. The layers or slices are numbered, and from such slice numbers it is evident that slices A-H are distanced several slices apart. As aforesaid, an exemplary slice is very thin, e.g. may have a thickness of only about 20 microns, thus despite the small difference in vertical height between the slices shown, they are in effect separated by many such intervening slices.

In some embodiments, the first layer of the object and its support construction being printed, may be preceded by one or more layers comprising only the second material, such preceding support material layers forming a 'pedestal' of support material prior to formation of the 3D object and its support constructions on top of the pedestal, e.g. for easy lifting of the entire fabrication (object+support construction/s) off the printing tray after completion of printing.

Accordingly, layer A shows one of the first, preceding slices fabricated in the 3D printing process, i.e. a pedestal slice comprising the weaker second supporting material. Optionally, the weaker second supporting material may be dispersed with minute elements of a different material for improved support capability. As aforesaid, a number of such first slices are printed to form a pedestal prior to commencing printing the object and its supporting construction's on top of the pedestal.

Layer B depicts one of the first slices of the object being fabricated, where the external criss-cross area represents the part of the layer which will form part of the final 3D object itself, for example as indicated by object volume 124 in FIG. 1. The inner diagonal lined and dotted areas represent the supporting construction, printed for example as indicated by supporting volume 126 in FIG. 1. As may be seen in the depiction of Layer B, the inner support construction comprises two different areas: a diagonal-lined area covering most of the support construction layer area, and a smaller, dotted area, covering a small 'wedge' shaped section of the layer. The diagonal-lined area is comprised of hi-tensile strength first material and the dotted area comprises a weaker second supporting material similar to that making up the pedestal slices.

As may be seen by comparing each of Layers B and C, Layers C and D, Layers D and E and Layers E and F, despite the fact that each pair is separated by between 5-15 intervening slices, each layer shown appears very similar in layout to its preceding layer, except for a very slight rotation of the dotted wedge area of weaker material within each layer of strong material, from slice to slice. In each consecutive slice, the area comprising strong material covers most of the area of strong material preceding it, with a very slight variation, i.e. rotation, and the wedge area comprising weak material mostly covers the wedge area of weak material in the slice preceding it, with a very slight variation, i.e. rotation.

Where the material in each slice covers and therefore is in direct contact with its same material in the preceding slice, the two materials adhere to each other, leaving only a very thin portion of the material not adhered to its same material in the preceding slice. This process is repeated slice after slice, or layer after layer, with minimal rotation of the placement, i.e. location of deposition, of the wedge of weak support material from slice to slice, to enable construction of (and subsequent easy separation of) the folds of the thick helix of strong material constructed within the support construction volume.

As depicted in FIG. 2B, exemplary Layers F and G are separated by over 2000 very thin layer slices. The wedge of weaker support material may be expected to have rotated a number of times during the course of deposition of the intervening over 2000 slices. At the same time the criss-cross area representing the object being fabricated has become thicker during the same course of deposition of over 2000 slices, as the concave object (represented in FIG. 1 by volume 124) is gradually fabricated from bottom to top. Layer H, being over 1700 slices higher than previously depicted layer G, depicts top slices of the concave object being fabricated, such slices forming the top of the object above the support construction and thus comprised entirely of modeling material (only criss-cross).

Layers comprising the support construction may substantially fill a support construction volume, within, adjacent to and/or beneath at least part of the object construction. Not clearly visible in FIG. 2B is a very thin release layer e.g. a seam of weaker second material deposited on a boundary or circumference of a part of a layer comprising the support construction, between the supporting materials forming the support construction and the volume of modeling material forming the object. Positioning of the release layer may be exemplified by the black circle surrounding the inner diagonal lined and dotted areas representing the support construction.

Figure 3B:
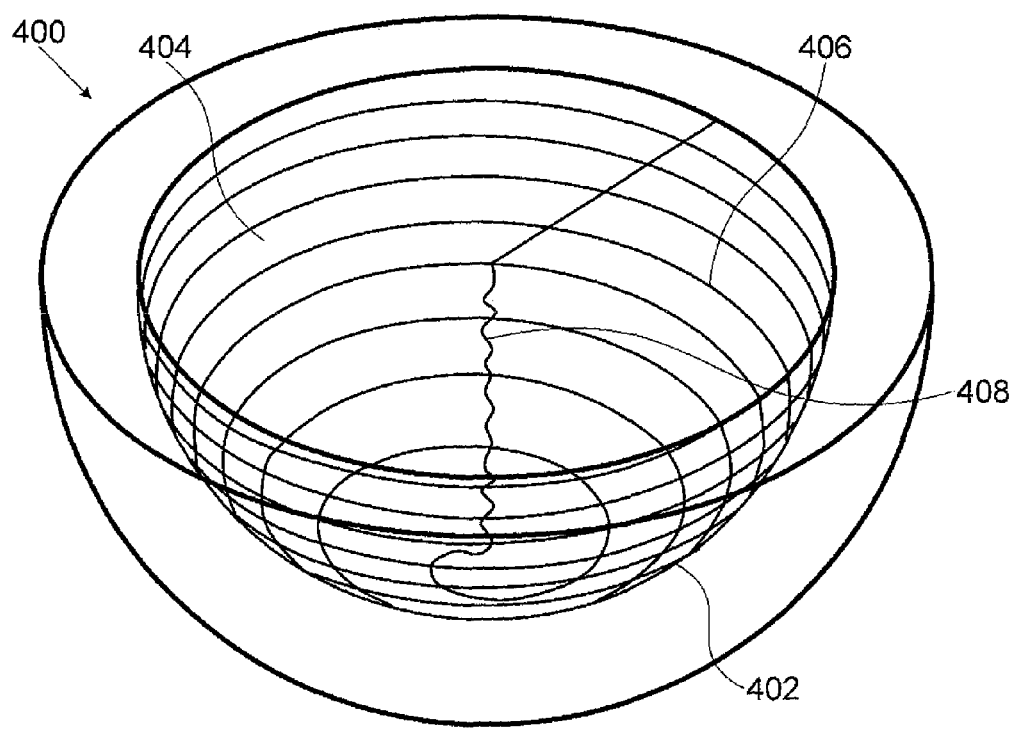
FIG. 3B is a cut away view of a support construction filing a volume within an object.
Figure 3C:
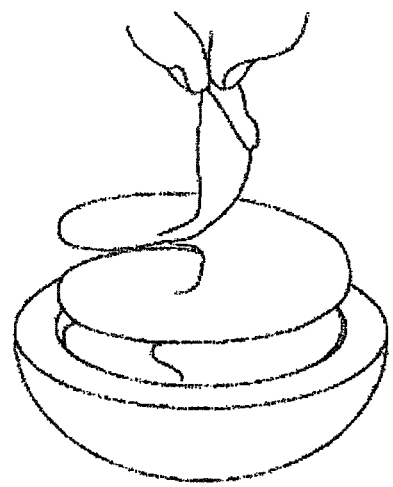
FIGS. 3C and 3D are schematic diagrams of a supporting material being pulled from a model, in accordance with an embodiment of the invention
Figure 3D:
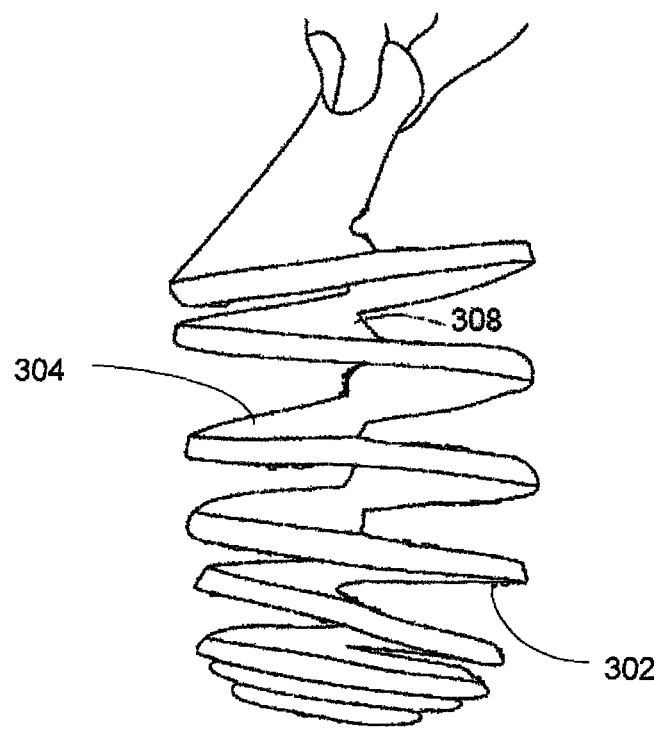

Reference is now made to FIG. 3A, a schematic diagram of a cut away side view of a support construction in accordance with an embodiment of the invention, to FIG. 3B, a schematic diagram of a cut away three-quarters side view of the concave object being printed, showing graphically in its center the support construction volume, divided into layers, with a common central vertical axis (represented in FIG. 3A as 308 and in FIG. 3B as 408), to FIG. 3C, a view of a concave object having a support construction in its cavity, which support construction is in process of being pulled or lifted out of the volume, and to FIG. 3D, a view of a support construction lifted away in its entirety from a volume, in accordance with an embodiment of the invention.

In some embodiments, a cut away view of a support construction 300 may show for example a continuous spiral coil or helix of hi-tensile strength material 304 interspersed, e.g. separated by weaker support material 302 filling the spaces within and between the layers of hi-tensile strength material 304. In some embodiments, support construction 300 may be removed from a volume by pulling or lifting of an edge 306 of strong material for example by, at or near a top or outer surface of support construction 300 and thus accessible to a user or operator, as may be seen, e.g. in FIG. 3C.

In a preferred embodiment, a spiral, coil or helix of strong material 304 is printed or deposited as part of the layer-by-layer 3D printing process such that a middle or other common area throughout the layers of support construction 300 shares a vertical axis 308. In some embodiments, shared vertical axis 308 allows a user to peel away and thus lift support material 304 such that it may be removed in its entirety as a ribbon, continuous sheet, spiral or screw shape of strong material 304, as shown in FIG. 3D. Other configurations or placements of strong material 304 within a support volume are possible to generate other shapes of the removed support construction 300.

The thin portions of support material 302 interspersed within, amongst and between layers of strong material 304 forming the helical support construction, being a weaker, gel-like material, enables easy and swift separation of the folds of the helix, thus facilitating its removal. The thin support material, being weakly contacted at its interface with the stronger material and with the same weak support material in preceding and subsequent layers, is mostly lifted out of the support construction volume together with, e.g. by clinging to the helix of hi-tensile strength material.

FIG. 3B shows schematically the walls of a concave object 400 printed around a support construction volume 402. Said support construction is formed in layers of first supporting material 404, together with a separating second support material 406 to form a helical structure within the volume. In the construction as shown in FIG. 3B, all support construction layers share a central vertical axis 408.

FIG. 3C, as aforesaid, shows a view of a concave object with a support construction constructed as described herein within its cavity, which support construction is beginning to be pulled or lifted out of the volume by a user or operator. FIG. 3D shows the same helical support construction, i.e. strip of stronger material 304 around a vertical axis 308 after having been removed or lifted in its entirety out of the support construction volume. Remnants of weaker support material 302 clinging to the helical strip and removed together with it are evident.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method of constructing a support construction in a process of fabricating a three dimensional (3D) object, comprising:
    selectively depositing in layers, layer by layer, a modeling material according to cross-sectional layers of the 3D object;
    selectively depositing in the layers as a support construction, a first and second supporting materials, wherein said first and second supporting materials are deposited in a volume designed to be an empty space in said 3D object, and wherein said support construction comprises a strip of the first supporting material, said strip intersecting said layers in said volume; and
    removing said support construction from said volume upon application of a lifting force on said strip.

2. The method as in claim 1, where said strip is configured as a coil within said volume.

3. The method as in claim 1, further comprising depositing said second supporting material in a layer of said layers between an edge of said modeling material in said layer and an edge of said support construction in said layer.

4. The method as in claim 1, further comprising depositing said second supporting material in a plurality of layers before depositing said layers comprising said modeling material and said first and second supporting materials, such that said layers comprising modeling material and first and second supporting materials are deposited on top of said layers comprising second supporting material.

5. A method of constructing a support construction in a process of fabricating a three dimensional (3D) object, comprising:
    selectively depositing, layer by layer, a modeling material according to cross-sectional layers of the 3D object and a first and a second supporting material, said first and second supporting materials configured as a support construction in a volume configured as an empty space in said 3D object;
    wherein said support construction comprises a strip of the first supporting material, said strip intersecting a plurality of horizontal layers in said volume and said support construction comprises a second supporting material that fills in at least a portion of said volume; and
    wherein upon application of a lifting force on said strip, said strip and said second supporting material are removed from said volume.

6. The method as in claim 5, further comprising selectively depositing said second supporting material on at least a point between said modeling material and said support construction in a layer.

7. The method as in claim 5, wherein said selectively depositing said first supporting material comprises selectively depositing said first supporting material in layers to form a continuous strip intersecting a said plurality of support construction layers.

8. A method for producing a support construction by solid freeform fabrication, comprising:
    depositing a first layer of said support construction within a volume, a first area of said first layer including a first material and a second area of said first layer including a second material; and
    depositing, over said first layer, a second layer of said support construction within said volume, a first area of said second layer including said first material and a second area of said second layer including said second material, said first area of said first layer adhering to a portion but not all of said first area of said second layer; wherein upon application of a pulling force to said first layer, at least a portion of said first layer is removed from said volume, and said first area of said first layer conveys said pulling force to said first area of said second layer, and a remainder of said first layer and at least a portion of said second layer are removed from said volume at the same time.

9. The method as in claim 8, wherein said first material is deposited on an area of said first layer comprising more than half of said first layer, and wherein said first material is deposited on an area of said second layer comprising more than half of said second layer.

10. The method as in claim 8, wherein said first material in said first layer and said second layer forms a continuous strip of first material through said first layer and said second layer.

11. The method as in claim 8, wherein a vertical axis of said first area in said first layer intersects with a vertical axis of said first area in said second layer.

12. The method as in claim 8, wherein said first area in said second layer intersects with a bottom of said second layer and a top of said second layer at congruent angles, and said first area in said first layer intersects with a bottom of said first layer and with a top of said first layer at congruent angles, all of said angles being non-right angles.

13. The method as in claim 8, wherein a set of layers fills a volume of said support construction.

14. The method as in claim 8, wherein said depositing includes depositing a second supporting material on at least a point on a circumference of said support construction in a layer.

* * * * *